United States Patent
Falkenstein et al.

(10) Patent No.: US 8,512,200 B2
(45) Date of Patent: Aug. 20, 2013

(54) METHOD FOR OPERATING A HYBRID DRIVE OF A MOTOR VEHICLE

(75) Inventors: Jens-Werner Falkenstein, Aalen (DE); Michael Glora, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 578 days.

(21) Appl. No.: 12/450,821

(22) PCT Filed: May 9, 2008

(86) PCT No.: PCT/EP2008/055747
§ 371 (c)(1),
(2), (4) Date: Mar. 16, 2010

(87) PCT Pub. No.: WO2008/138886
PCT Pub. Date: Nov. 20, 2008

(65) Prior Publication Data
US 2010/0167869 A1    Jul. 1, 2010

(30) Foreign Application Priority Data
May 16, 2007  (DE) .......................... 10 2007 023 164

(51) Int. Cl.
*B60K 1/02*   (2006.01)
*H02P 1/00*   (2006.01)
*H02P 3/00*   (2006.01)
*H02P 7/00*   (2006.01)
*B60W 10/00*  (2006.01)
*B60W 20/00*  (2006.01)

(52) U.S. Cl.
USPC ......... 477/3; 477/7; 180/65.265; 180/65.285; 701/22

(58) Field of Classification Search
USPC .......... 477/3, 7; 180/65.265, 65.285; 701/22
See application file for complete search history.

(56) References Cited

U.S. PATENT DOCUMENTS

| 6,319,168 | B1  | 11/2001 | Morris et al.    |         |
|-----------|-----|---------|------------------|---------|
| 6,840,045 | B2* | 1/2005  | Kusase           | 60/702  |
| 7,367,864 | B2* | 5/2008  | Jung et al.      | 477/34  |
| 7,877,184 | B2* | 1/2011  | Watanabe et al.  | 701/54  |
| 8,037,955 | B2* | 10/2011 | Huber et al.     | 180/65.28 |
| 8,116,927 | B2* | 2/2012  | Yu et al.        | 701/22  |
| 8,167,065 | B2* | 5/2012  | Falkenstein et al. | 180/65.265 |

FOREIGN PATENT DOCUMENTS

| DE | 101 26 348 | 1/2002 |
| EP | 1 431 623  | 6/2004 |
| EP | 1 632 378  | 3/2006 |

* cited by examiner

*Primary Examiner* — Tisha Lewis
(74) *Attorney, Agent, or Firm* — Kenyon & Kenyon LLP

(57) ABSTRACT

In a method for operating a hybrid drive of a vehicle having at least one internal combustion engine and at least one first electric machine as drive machines of a first drive train of the vehicle, and an associated first transmission, the total torque of the drive machines is adapted in a shifting operation of the transmission in order to reduce the load at the transmission and/or in order to modify rotational speeds according to the new transmission ratio, and/or the torque gradient of the drive machines is restricted to a specifiable, maximum torque gradient of the resulting total torque of the drive machines of the first drive train in a transition between acceleration operation and trailing throttle operation.

7 Claims, 4 Drawing Sheets

METHOD FOR OPERATING A HYBRID DRIVE OF A MOTOR VEHICLE

BACKGROUND OF THE INVENTION

1. Field of the Invention

The present invention relates to a method for operating a hybrid drive of a vehicle having at least one internal combustion engine and at least one first electric machine as drive machines of a first drive train of the vehicle, as well as an associated first transmission, the total torque of the drive machines being adapted when shifting the transmission in order to reduce the load at the transmission and/or in order to modify rotational speeds according to the new transmission ratio; in addition or as an alternative, in a transition between acceleration operation and trailing throttle operation, the torque gradient of the drive machines is restricted to a specifiable, maximum torque gradient of the resulting total torque of the drive machines of the first drive train.

2. Description of Related Art

Such a method for operating a hybrid drive of a vehicle is generally known. In hybrid drives the internal combustion engine, one or a plurality of electric machine(s) and a transmission of the first drive train are frequently combined into one drive unit and jointly mounted inside the vehicle. The drive unit is connected to a vehicle body of the vehicle via soft bearing elements in order to keep the vibrations produced by the internal combustion engine as well as structure-borne noise away from the vehicle body.

Rapid load changes can generate undesired jerking of the vehicle, in which the moment of inertia of the drive unit typically vibrates against the reduced vehicle mass. Still other forms of vibrations are possible as well. Known methods for reducing bucking vibrations are based on avoiding the excitation of the first drive train by rapid load changes. To this end, in rapid torque changes or high torque gradients, the torque requested by the driver via the driving pedal is filtered, using a low-pass filter, with the aid of a reference-forming unit, and/or its torque gradient is restricted to a maximum torque gradient. This causes a delay in the torque generation or the torque reduction. A zero crossing of the resulting total torque of the drive machines of the first drive train during the transition from trailing throttle to acceleration operation, for example, leads to a zero crossing of the reaction torque and to tilting of the drive unit in the soft bearing elements, which induces vibrations of the first drive train. In addition, mechanical plays or slacks existing in the drive train are run through. For comfort-related reasons, this transition should be a "smooth" transition, which is achieved by restricting the gradient of the resulting total torque of the drive machines of the first drive train during its zero crossing. This, too, is the task of the reference-forming element. It coordinates the drive machines, especially the drive torques of the drive machines (internal combustion engine and first electric machine) of the first drive train. In the case of a hybrid drive designed as parallel hybrid drive and equipped with a crankshaft starter generator as electric machine, a flywheel of the internal combustion engine in particular being coupled to the electric machine, the zero crossing of the summed torque of internal combustion engine and electric machine causes the drive unit to tilt.

In a shifting operation of the transmission of the first drive train, drive torques must be adapted to the requirements in force during the shifting operation as quickly as possible in order to provide rapid, comfortable shifting operations. To this end, the drive machines of the first drive train are controlled in a coordinated manner. The total torque of the drive machines is adapted when shifting the transmission in order to reduce the load at the transmission and/or in order to modify rotational speeds—in particular of inert masses—according to the new transmission ratio. In the case of the parallel hybrid having a crankshaft starter generator as electric machine, the summed torque of internal combustion engine and electric machine is acting at the input of the first transmission of the first drive train, for example. If this transmission cannot be shifted under load, then the summed torque must be brought to zero during the shifting operation. Depending on the operating state, this may be accomplished by lowering the drive torque of the electric machine, or else also by increasing it, e.g., when the summed torque is negative prior to the shifting operation.

BRIEF SUMMARY OF THE INVENTION

In accordance with the present invention, in order to increase the dynamic response of the vehicle, the electric energy additionally produced in the adaptation and/or the restriction as a result of an increased generator-driven operation of the first electric machine is utilized at least by one additional second electric machine for driving at least one additional drive train for the propulsion of the vehicle, or the energy additionally required in the adaptation and/or the restriction for an increased engine-driven operation of the first electric machine is additionally generated by the second electric machine, or its use is reduced. In the context of this application, a restriction of the torque gradient to a maximum torque gradient always refers to the restriction to a maximum amount of the torque gradient. For this purpose, the restriction takes place in particular with the aid of at least one reference forming unit, which in rapid torque changes or at high torque gradients, filters the torque requested by the driver via the driving pedal by means of a low-pass filter, and/or which restricts its torque gradient to a maximum torque gradient. This restriction suppresses or avoids undesired jerking of the vehicle in the transition between acceleration and trailing throttle operation, the jerking being caused by a relative movement of the internal combustion engine and/or the first electric machine and/or the first transmission assigned to the internal combustion engine and the first electric machine. For example, the restriction of the torque gradient in the first drive train extends across a time interval in which the first electric machine is intermittently and increasingly operating in generator-driven operation in order to reduce the resulting torque. The electric energy additionally produced in this manner is supplied, in particular without intermediate storage, to the second electric machine, which drives the vehicle via the second drive train and thereby at least partially compensates the reduction of the torque in the first drive train in relation to the total drive of the vehicle. The second electric machine is mounted in the vehicle independently of the drive machines of the first drive train. More specifically, the mounting of the second electric machine is tighter than the mounting of the drive machines. This has the result that the electric energy obtained while restricting the torque gradient at the first drive train is advantageously utilized by the second electric machine at the second drive train. Similar advantages result from the adaptation of the total torque of the drive machines of the first drive train.

In one advantageous development of the present invention, the drive machines drive at least one first powered axle of the vehicle via the first drive train, and the second electric machine drives at least one second powered axle of the vehicle via the second drive train. The hybrid drive may be a hybrid all-wheel drive, for example.

According to one further development of the present invention, the maximum torque gradient of the restriction is selected such that a common mounting of the combustion engine and/or the first electric machine and/or the first transmission is shifted from a first final position to an opposite, second final position without jerking. Because of the soft mounting of the drive machines, a high torque gradient causes their abrupt shifting relative to a vehicle body of the vehicle, in the course of which the common mounting shifts from the first final position to the opposite, second final position. There, the movement is abruptly reflected and undesired vibrations are produced. The drive machines and the associated transmission preferably make up one unit and, as such, are jointly mounted in a "soft" manner.

In one advantageous development of the present invention, the total torque of the drive machines of the first drive train is adapted within specified limits of change, by adjusting the torque and/or power of the first electric machine and/or by modifying the ignition angle of the internal combustion engine. The adaptation is preferably implemented by a torque and/or power adaptation of the first electric machine.

In an advantageous manner, the restriction is implemented within specified limits by adapting the torque and/or power of the first electric machine and/or by modifying the ignition angle of the internal combustion engine. It is preferred if the restriction is implemented by adapting a torque and/or output of the first electric machine. The internal combustion engine is designed as Otto engine, in particular. Otto engines having manifold injection usually come equipped with an electronic throttle valve for regulating the air mass flow. The accelerator pedal is mechanically decoupled from the electronic throttle valve. The finite adjustment speed of the throttle valve actuator as well as dynamic charge effects in the intake manifold do not allow for a highly dynamic adjustment of a specified air mass flow and of the combustion engine torque produced as a result. On the other hand, an ignition angle intervention and an associated reduction of the combustion engine torque may be implemented virtually without delay. However, interventions in the ignition angle lead to losses in efficiency and, at high loads, to temperature peaks in the exhaust gas, which may result in damage to or adverse effects on the service life of components, e.g., the turbocharger or catalytic converter. Ignition-angle interventions will not be discussed further in the following text.

The present invention also provides a control unit for implementing at least one of the aforementioned methods. The control unit coordinates especially the torques and/or the torque gradients of the drive machines of the first drive train, and the torque and the torque gradient of the second electric machine. The at least one reference forming unit is preferably implemented in the control unit. For example, the control unit is a control unit superposed to the control devices of the drive machines, combustion engine and first electric machine, as well as superposed to the second electric machine, the coordination of the torques/torque gradients taking place by controlling the control devices (engine control devices of the internal combustion engine and the electric machines). As an alternative, the control unit is implemented in one of the control devices. The control unit is preferably implemented in the control device of the internal combustion engine. This is advantageous because at least one reference forming unit is also implemented in control devices of internal combustion engines of conventional (using internal combustion engines exclusively) drive concepts.

DETAILED DESCRIPTION OF THE INVENTION

Figure 1:
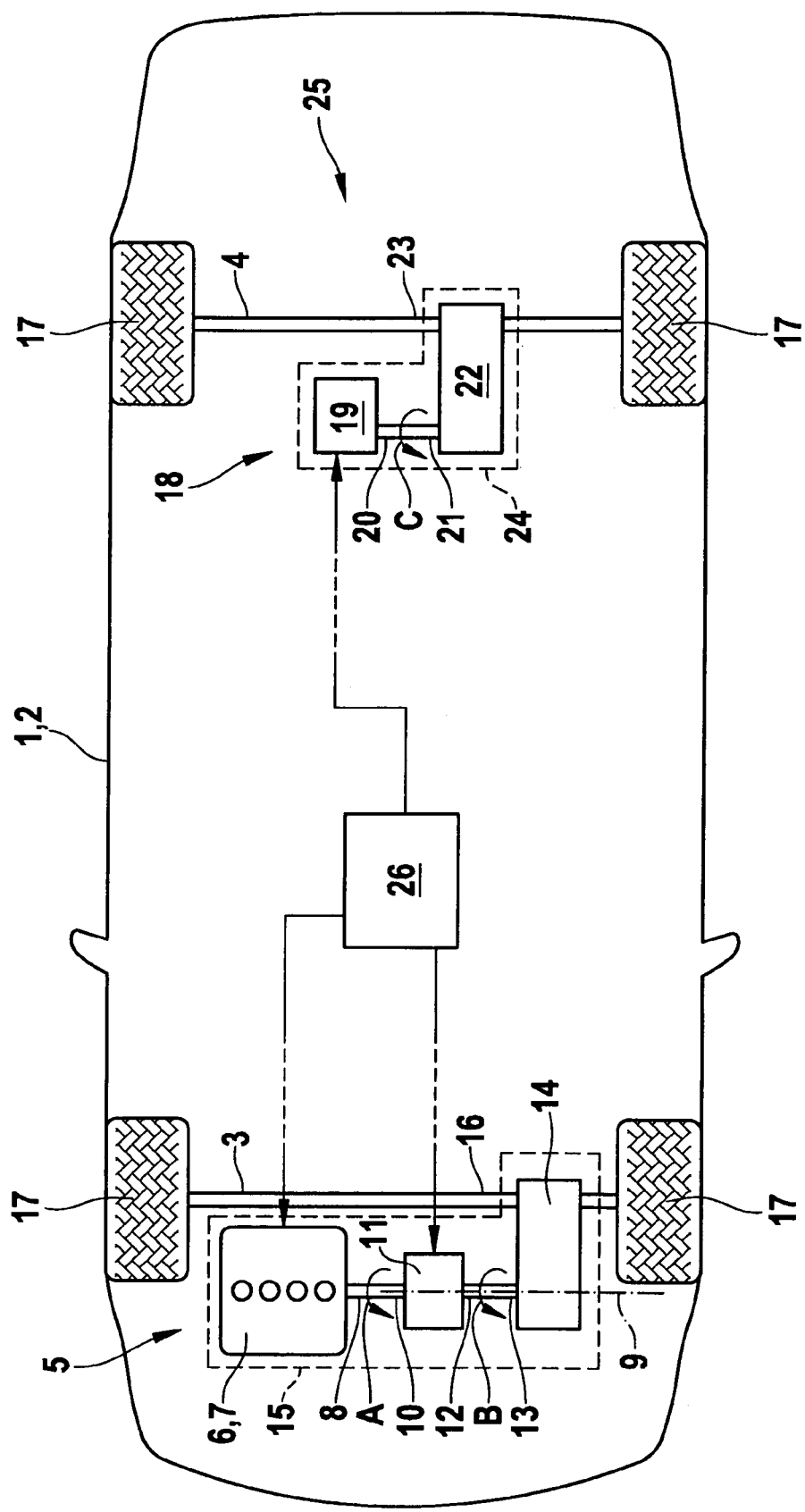
FIG. 1 shows a vehicle having a first powered axle driven by an internal combustion engine and a first electric machine, and having a second powered axle driven by a second electric machine.

FIG. 1 shows a plan view of a vehicle 2 implemented as motor vehicle 1, which has a first powered axle 3 and a second powered axle 4. An internal combustion engine 7 realized as Otto engine 6 is situated in a first drive train 5, which drives first powered axle 3. A power takeoff train 8 of internal combustion engine 7 sits on an axle 9 and leads to a drive/power takeoff train 10, likewise sitting on axle 9, of a first electric machine 11 via a first shiftable clutch (not shown). Internal combustion engine 7 and first electric machine 11 are drive machines 7, 11 of first drive train 5, which is driving first powered axle 3. A shared power takeoff train 12 of combustion engine 7 and first electric machine 11 is connected to a transmission drive train 13 of a first transmission 14 via a (likewise not shown) second shiftable clutch. Transmission 14, internal combustion engine 7 and first electric machine 11 make up a unit 15, which is "softly" mounted in a vehicle body (not shown) of vehicle 2. A transmission power takeoff train 16 is connected to first powered axle 3 and drives the two driven wheels 17 of this powered axle 3. Internal combustion engine 7 generates an actual torque Eng_trqBs (arrow A) at its power takeoff train 8. First electric machine 11 generates an actual torque ElM1_trq at its drive/power takeoff train 10. Thus, torque Eng_trqBs+ElM1_trq (arrow B) is applied at transmission drive train 13 of first transmission 14.

A second electric machine 19 is situated in a second drive train 18, which drives second powered axle 4. A drive/power takeoff train 20 of second electric machine 19 leads to a transmission drive train 21 of a second transmission 22 via an additional shiftable clutch (not shown). Second electric machine 19 generates an actual torque ElM2_trq (arrow C) at its drive/power takeoff train 20. A transmission power takeoff train 23 of second transmission 22 is connected to second powered axle 4. This second powered axle 4 is also driving two driven wheels 17. Transmission 22 and second electric machine 19 form a unit 24, which is "tightly" mounted in the vehicle body (not shown) of vehicle 2. The two units 15, 24 are part of a hybrid drive 25 of vehicle 2. Electric machines 11, 19 are able to be operated in engine-driven manner as electric motor and, in generator-driven manner, as generator. A control unit 26 connected to control devices (not shown) of internal combustion engine 7 and electric machines 11, 19 coordinates their torques and/or torque gradients. The connection is indicated by dashed lines. Control unit 26 is superposed to the control devices and coordinates especially also the control devices of transmissions 14, 22 and the shiftable clutches. Implemented inside control unit 26 are reference forming units, which are described in FIG. 2.

Internal combustion engine 7, realized as Otto engine 6, is equipped with the following components (not shown): manifold injection, electronic gas pedal (E-gas, electronic throttle valve) and catalytic converter. A flywheel (not shown) of internal combustion engine 7 is coupled to a first electric machine 11, which is designed as crankshaft starter generator. Actual torque Eng_trqBs of internal combustion engine 7 and actual torque ElM1_trq of first electric machine 11 are added up and form the drive torque of first powered axle 3, which is forwarded to driven wheels 17 of first powered axle 3 with the aid of first transmission 14. Second powered axle 4 is driven by second electric machine 19, which generates drive torque ElM2_trq. Transmission 22 forwards drive torque E1M2_trq to driven wheels 17 of second powered axle 4 (FIG. 1).

In the case of hybrid vehicles having a plurality of powered axles 3, 4, unit 15, which is made up of internal combustion engine 7, transmission 14 and electric machine(s) 11, acts on one of powered axles 3 in most cases, while one or a plurality of additional powered axle(s) 4 is driven by units 24 implemented as electro machine transmission units. Electric machines 11, 19 generate barely any vibrations, so that in comparison with unit 15, which includes internal combustion engine 7, electro machine transmission units 24 are able to be connected to the vehicle body via more rigid bearings. Mechanical play or slackness are also frequently less pronounced in electro machine transmission units 24. As a result, higher gradients of the drive torques in the zero crossing are able to be achieved at powered axles 4 having electro machine transmission units 24, without restricting the driving comfort.

Figure 2:
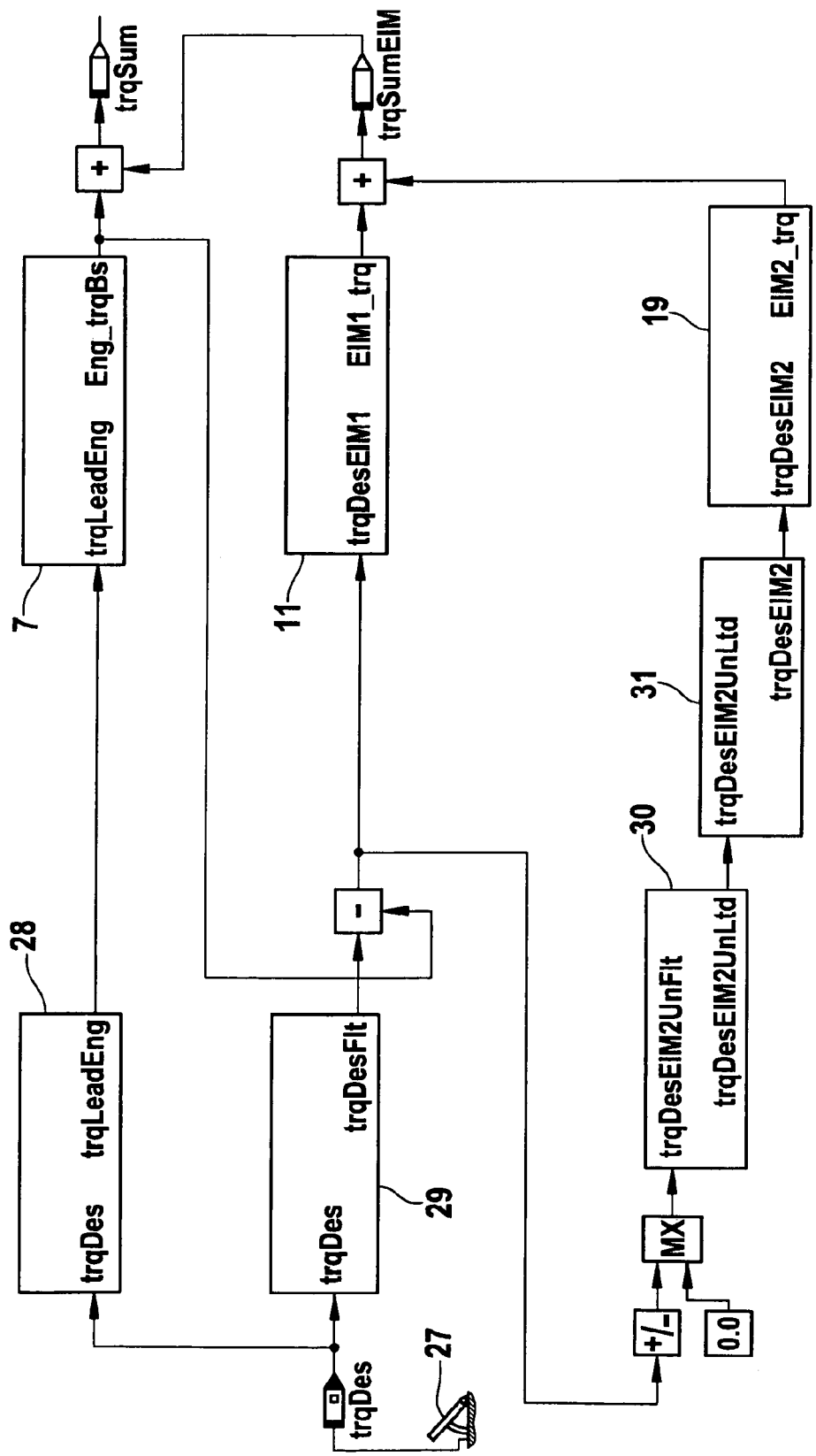
FIG. 2 shows a block diagram, which indicates the method of functioning of a control of the internal combustion engine and the electric machines of the hybrid drive.

FIG. 2 shows a circuit diagram, which indicates the method of functioning of a control of internal combustion engine 7 and electric machines 11, 19 of hybrid drive 25. The driver-desired torque trqDes indicated via drive pedal 27 is applied at the inputs of the reference forming units of internal combustion engine 7 (block 28) and the summed torque of the first drive train (block 29). From this, the reference forming units of internal combustion engine 7 (block 28) determine a lead setpoint torque trqLeadEng. Lead setpoint torque trqLeadEng for internal combustion engine 7 is acting on the slow air path. The air mass flow is set accordingly. At an optimum ignition angle, internal combustion engine 7 generates torque Eng_trqBs denoted as base torque. In stationary operation, base torque Eng_trqBs is roughly equivalent to lead setpoint torque trqLeadEng. In non-stationary operation, dynamic charge effects are acting in the intake manifold; the transfer of lead setpoint torque trqLeadEng to base torque Eng_trqBs is approximately describable by a series connection of a dead-time element and a time-delay element of the first order (PT1). The intake manifold dynamics are frequently highly dependent upon the operating point of internal combustion engine 7 (load point, engine speed); modeling images the reality only insufficiently. A sufficiently precise forming of base torque Eng_trqBs by suitable input of lead setpoint torque trqLeadEng is therefore impossible. For example, precise setting of the zero crossing of the drive torque requires additional measures. The engine control of a modern internal combustion engine is able to determine the instantaneous base torque Eng_trqBs with the aid of measured or estimated variables; in the case of an Otto engine having intake-manifold injection, it is determined from the engine speed, intake manifold pressure, ignition timing and excess-air factor λ, for example. The torque control of a modern electric machine 11, 19 has a much higher dynamic response in comparison with the intake manifold dynamics of an internal combustion engine 7. In hybrid drives 25, one or more electric machine(s) 11 may be used for the precise forming of the drive torque generated in conjunction with internal combustion engine 7, if they are controlled as a function of instantaneous base torque Eng_trqBs. It is therefore possible to dispense with ignition angle interventions, provided corrective interventions in electric machine(s) 11 and related energy transformations are supported by one or more electric energy accumulators (not shown) over the required service life. From driver-desired torque trqDes, a filtered summed setpoint torque trqDesFlt is determined in the reference forming unit of the summed torque of the first drive train (block 29). Base torque Eng_trqBs is deducted from filtered summed setpoint torque trqDesFlt for first powered axle 3 and output to first electric machine 11 as first torque request. At the same time, if the torque request itself is negative, the amount of this torque request is forwarded to the input of the reference forming units of second electric machine 19 (block 30). A second torque request is output to second electric machine 19 via a restriction unit (block 31). The sum of the torques of the electric machines trqSumElM together with base torque Eng_trqBs of internal combustion engine 7 results in summed drive torque trQSum.

To simplify the illustration, the following preconditions are assumed:
1. The transmission ratios of transmissions 14 and 22 are of equal size; summed drive torque trqSum=Eng_trqBs+ElM1_trq+E1M2_trq of both powered axles 3, 4 is able to be converted into the sum of the wheel torques taking the shared transmission ratio into account. In addition, driven wheels 17 of the two powered axles 3, 4 have the same slip, so that the rotational speeds of the two electric machines 11, 19 and internal combustion engine 7 are identical.
2. The efficiency of each electric machine 11, 19 is ideal (=1).
3. The actual torques of electric machines 11, 19 are virtually identical with the setpoint torques because of high dynamics in the torque control.
4. No ignition angle interventions take place in internal combustion engine 7; the actual torque corresponds to base torque Eng_trqBs.
5. The following applies to the setpoint torques of electric machines 11, 19 in stationary driving operation: trqDesElM1=trqDesElM2=0, i.e., the electric energy accumulator has a charge state that is sufficient to supply the vehicle electrical system. A driver-desired torque trqDes is generated solely by internal combustion engine 7: Eng_trqBs=trqDes applies. This precondition is usually not met because the electric machines are used for the supply of the vehicle electrical system, yet it simplifies the illustration considerably. The power transmission at driven wheels 17 of first powered axle 3 is sufficient to transmit the torque generated by internal combustion engine 7.

Figure 3:
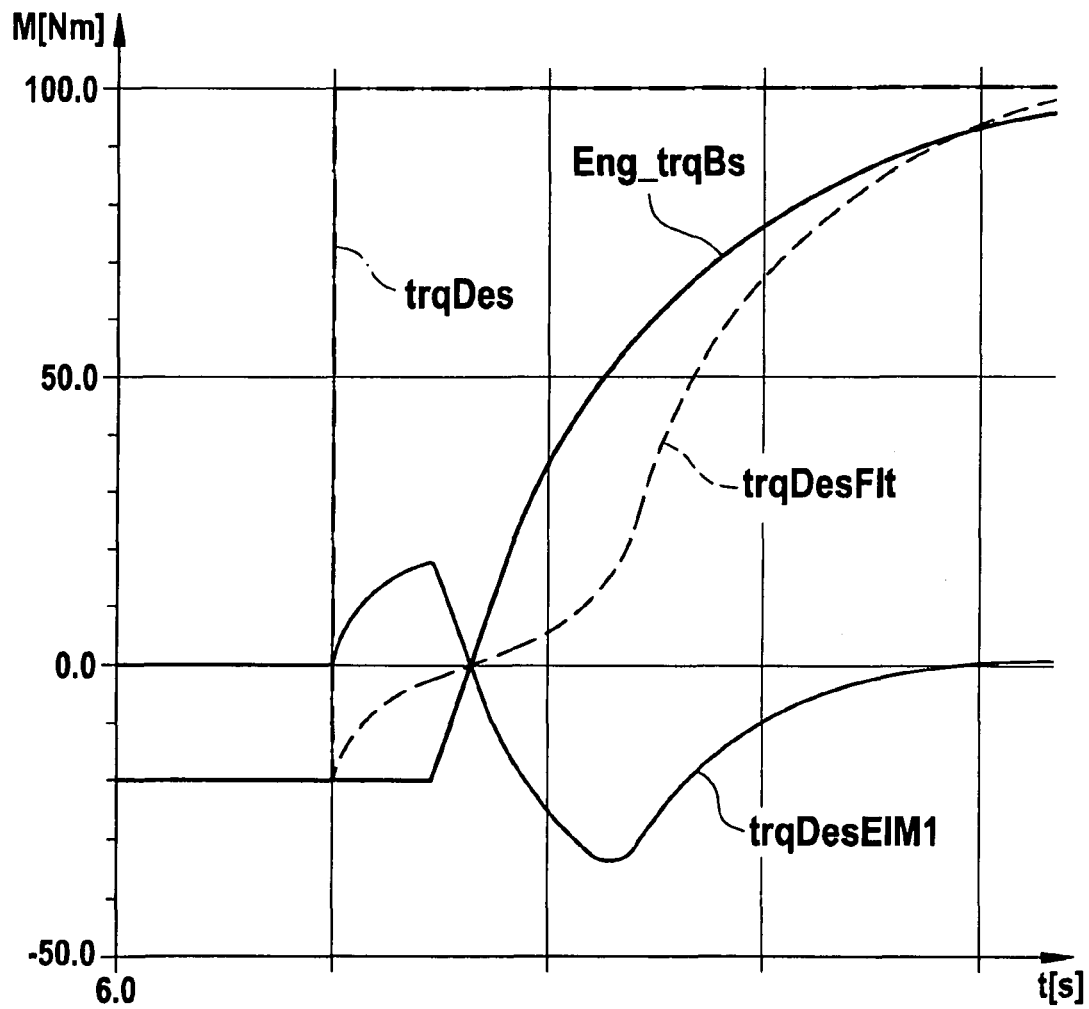
FIG. 3 shows a diagram in which a driver-desired torque, a setpoint torque specified by a reference forming unit, and the torques of the internal combustion engine and the first electric machine are plotted over the time.

FIG. 3 shows simulation results for a jump in driver-desired torque trqDes from −20 Nm to 100 Nm in a diagram, in which a torque M is plotted on the ordinate and time t on the abscissa. The transfer of lead setpoint torque trqLeadEng to base torque Eng_trqBs is described with the aid of a series connection of a dead-time element and a delay element of the first order (PT1) in block 7; the base torque follows lead setpoint torque with a corresponding delay. Immediately following the jump, block 29 increases filtered summed setpoint torque trqDesFlt, which has an effect on setpoint torque trQDesElM1 of first electric machine 11 and leads to a rapid response. Summed setpoint torque trqDesFlt of first powered axle 3 rises already at a time when base torque Eng_trqBs does not show any response yet as a result of the dead time. In the further course, base torque Eng_trqBs rises more rapidly than summed setpoint torque trqDesFlt, which exhibits a distinct shape of the zero crossing. To compensate the rapidly rising base torque, setpoint torque trqDesElM1 of first electric machine 11 becomes negative; first electric machine 11 therefore operates in generator-driven manner.

According to the present invention, a negative setpoint torque trqDesElM1 of first electric machine 11 is applied with an inverted sign to setpoint torque trqDesElM2 of second electric machine 19. This yields several advantages:
1. The loading of the electric energy accumulator is reduced; the generator power produced by first electric machine 11 is utilized by second electric machine 19.
2. A rapid generation of the summed torque of the two powered axles 3, 4 takes place, thereby obtaining a high dynamic response of vehicle 2.

Setpoint torque trqDesElM2 of second electric machine 19 is formed in block 30 and restricted in block 31 according to the permissible torque distribution to the two powered axles 3, 4.

Figure 4:
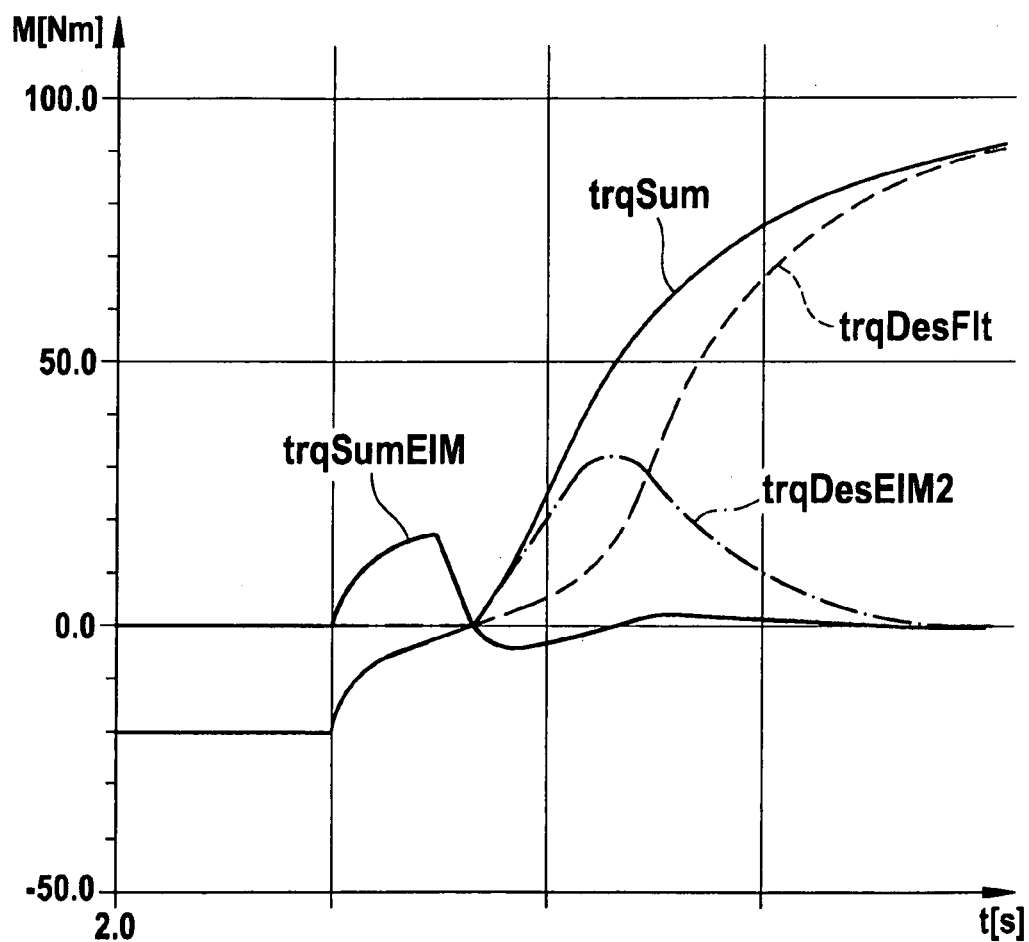
FIG. 4 shows a diagram in which the driver-desired torque, the setpoint torque, a summed setpoint torque of the electric machines, and a resulting summed setpoint torque of the two powered axles is plotted over the time.

In FIG. 4, setpoint torque trqDesElM2 in a jump in driver-desired torque trqDes according to FIG. 3 has been plotted in a diagram in which torque M is plotted on the ordinate and time t on the abscissa. With summed setpoint torque trqSumElM of the two electric machines 11, 19, the loading of the electric energy accumulator also remains low once the base torque has responded to the driver request. In comparison with summed setpoint torque trqDesFlt for first powered axle 3, summed setpoint torque trqSum for the two powered axles 3, 4 (transmission inputs) exhibits a considerably faster rise, which increases the dynamic response of vehicle 2.

In the exemplary embodiment zero has been selected as the stationary setpoint torques in electric machines 11, 19 for the sake of simplification. In the general case, if stationary setpoint torques are not equal to zero, a corresponding coordination relative to the stationary setpoint torques must be employed. Efficiencies of the electric machines 11, 19 not equal to one, and different transmission ratios of the two transmissions 14 and 22 can also easily be taken into account.

The parameters of block 28 and block 29 are a function of rotational speed and transmission ratio and are mutually adapted, taking into account the intake manifold dynamics and the torque limits of electric machines 11, 19 in order to obtain a high dynamic response of vehicle 2.

The present invention may be used for all hybrid drives 25 of a vehicle 2 having a plurality of powered axles 3, 4, in which at least one powered axle 4 is driven by one or more electric machine(s). The use in parallel hybrids and also in power-distributed hybrid drives is possible.

What is claimed is:

1. A method for operating a hybrid drive of a vehicle, comprising:
    providing at least one internal combustion engine and at least one first electric machine as drive machines of a first drive train of the vehicle, and an associated first transmission;
    performing at least one of: (1) adaptation of the total torque of the drive machines of the first drive train in a shifting operation of the transmission in order to at least one of (a) reduce the load at the transmission and (b) modify rotational speeds according to a new transmission ratio; and (2) restriction of the torque gradient of the drive machines of the first drive train to a specified, maximum torque gradient of the resulting total torque of the drive machines of the first drive train in a transition between acceleration operation and trailing throttle operation;
    providing at least one second electric machine for driving at least one second drive train; and
    one of the following is performed: (i) electric energy additionally produced in the at least one of the adaptation of the total torque and the restriction of the torque gradient by an increased generator-driven operation of the first electric machine is utilized by the at least one second electric machine for driving the at least one additional drive train, for the propulsion of the vehicle, or (ii) energy additionally required in the at least one of the adaptation of the total torque and the restriction of the torque gradient for an increased engine-driven operation of the first electric machine is generated by the second electric machine;
    wherein the maximum torque gradient for the restriction is selected such that a common mounting of at least one of the combustion engine, the first electric machine, and the first transmission is shifted without jerking from a first final position to an opposite, second final position.

2. The method as recited in claim 1, wherein the total torque of the drive machines of the first drive train is adapted by at least one of a torque adaptation of the first electric machine, a power adaptation of the first electric machine, and a modification of the ignition angle of the internal combustion engine within respective specified limits of change.

3. The method as recited in claim 1, wherein the restriction of the torque gradient is implemented by at least one of a torque adaptation of the first electric machine, a power adaptation of the first electric machine, and a modification of the ignition angle of the internal combustion engine within respective specified limits of change.

4. The method as recited in claim 1,
    wherein the energy additionally required is supplied to the second electric machine without intermediate storage.

5. The method as recited in claim 1, wherein the drive machines of the first drive train drive at least one first powered axle of the vehicle, and the second electric machine drives at least one second powered axle of the vehicle by the second drive train.

6. A control unit for operating a hybrid drive of a vehicle, the hybrid drive including at least one internal combustion engine and at least one first electric machine as drive machines of a first drive train of the vehicle, a first transmission associated with the first drive train, at least one second electric machine, and at least one second drive train, the control unit comprising:
    means for performing at least one of: (1) adaptation of the total torque of the drive machines of the first drive train in a shifting operation of the transmission in order to at least one of (a) reduce the load at the transmission and (b) modify rotational speeds according to a new transmission ratio; and (2) restriction of the torque gradient of the drive machines of the first drive train to a specified, maximum torque gradient of the resulting total torque of the drive machines of the first drive train in a transition between acceleration operation and trailing throttle operation; and
    means for performing one of the following: (i) utilizing by the at least one second electric machine, electric energy additionally produced in the at least one of the adaptation of the total torque and the restriction of the torque gradient by an increased generator-driven operation of the first electric machine, for driving the at least one additional drive train, for the propulsion of the vehicle, or (ii) generating by the second electric machine energy additionally required in the at least one of the adaptation of the total torque and the restriction of the torque gradient for an increased engine-driven operation of the first electric machine;

wherein the maximum torque gradient for the restriction is selected such that a common mounting of at least one of the combustion engine, the first electric machine, and the first transmission is shifted without jerking from a first final position to an opposite, second final position.

7. The control unit as recited in claim 6, wherein the energy additionally required is supplied to the second electric machine without intermediate storage.

\* \* \* \* \*

UNITED STATES PATENT AND TRADEMARK OFFICE
CERTIFICATE OF CORRECTION

PATENT NO.       : 8,512,200 B2
APPLICATION NO. : 12/450821
DATED            : August 20, 2013
INVENTOR(S)      : Falkenstein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 816 days.

Signed and Sealed this

Fifteenth Day of September, 2015

Michelle K. Lee
*Director of the United States Patent and Trademark Office*